United States Patent [19]
Smith

[11] Patent Number: 5,970,024
[45] Date of Patent: *Oct. 19, 1999

[54] ACOUSTO-OPTIC WEAPON LOCATION SYSTEM AND METHOD

[76] Inventor: Thomas Smith, 55A N. Liverpool Rd., Manchester, Pa. 17345

[ * ] Notice: This patent issued on a continued prosecution application filed under 37 CFR 1.53(d), and is subject to the twenty year patent term provisions of 35 U.S.C. 154(a)(2).

[21] Appl. No.: 08/834,754

[22] Filed: Apr. 30, 1997

[51] Int. Cl.$^6$ .................................................. G01S 3/80
[52] U.S. Cl. ............................................................. 367/128
[58] Field of Search ............................... 367/128; 342/52, 342/53, 56; 356/342

[56] References Cited

U.S. PATENT DOCUMENTS

| | | |
|---|---|---|
| 2,823,974 | 10/1958 | Daniels . |
| 3,614,723 | 10/1971 | Hermes et al. ........................ 367/128 |
| 3,722,594 | 3/1973 | Smith et al. . |
| 3,727,861 | 4/1973 | Swann .................................. 244/3.15 |
| 3,848,129 | 11/1974 | Figler et al. . |
| 3,936,822 | 2/1976 | Hirschberg ............................ 367/128 |
| 3,944,167 | 3/1976 | Figler et al. . |
| 4,138,660 | 2/1979 | Hill . |
| 4,350,881 | 9/1982 | Knight et al. . |
| 4,885,725 | 12/1989 | McCarthy et al. . |
| 5,258,962 | 11/1993 | Karlsen . |

OTHER PUBLICATIONS

U.S. Department of Commerce, Development of a flash, bang, and smoke simulation of a shell burst, Jan., 1982, 167 pages, United States of America.
Kathleen A. Kelley, Letter to John G. Chupa, Nov. 24, 1998, 1 page, United States of America.
US Dept of Technology, Enviro Trade, Laser Remote Sensing, Air Pollution, Hun, Jun. 4, 1996, Internet.
SRI International, Fine Particle Technology, 1995–96, Internet huestis@mplvax.sri.com.
OCA Applied Optics, OCA's Lidar Technology. 1996, Internet www.oca.com/LIDAR.ntml.
LIDAR, Introduction to Lidar, Jun. 27, 1996, Internet—LIDAR Home Page.
Ric DeMeis, UV Lidar Aimed at Dual–Use Applications—Apr. 28, 1995, Laser Focus World, 1995, Penn Well Publishing Co. Tulsa, OK, USA, Internet www.lfw.com/www/newj/dualuse.htm.
LTI Laser Technologies Inc., How a laser range finder works, Amadeus Consulting Group, Inc. Internet Lasertek@ix.netcom.com.
Operating Instructions for Cincinnati Electronics IRC–160ST Staring–Mid Wavelength Infrared (S–MWIR) Camera Sep. 23, 1993, Oct. 4, 1993, pp. 1–6.
Smith, Thomas D., Acousto–Optic Hostile Weapon Localization System, Revised Jun. 1996.
Smith et al., Signature Identification Using Programmable Pattern Recognition, pp. 1–11.
Thomas D. Smith, Ph. D. P. E., Acoustic Detection and Source Localization Systems presented to The Advanced Research Projects Agency, Jun. 13, 1994, U.S.A. (8 pages).
Thomas D. Smith, Ph. D. P. E., Gunfire Source localization Systems presented to General Dynamics Land Systems Division, Jul. 7, 1994, U.S.A., (23 pages).

*Primary Examiner*—Daniel T. Pihulic
*Attorney, Agent, or Firm*—Chupa & Alberti, P.C.

[57] ABSTRACT

An weapon localization system for determining the location of hostile weapon fire. In one embodiment, the weapon localization system includes acoustical detection means for detecting energy of a first frequency originating from said hostile weapon fire; and for transmitting a first set of data describing the location of said hostile weapon fire; optical detection means for detecting energy of a second frequency originating from said hostile weapon fire, and for transmitting a second set of data describing the location of said hostile weapon fire; and processing means coupled to said acoustical and said optical detection means, for receiving said first and said second set of data, and for determining whether said location of said first set of data match said location of second set of data and for generating a signal output if said match occurs.

18 Claims, 7 Drawing Sheets

(List continued on next page.)

OTHER PUBLICATIONS

Thomas D. Smith, Ph. D. P. E., Gunfire Source Localization Systems presented to Loral Infrared and Imaging Systems, Jul. 29, 1994, U.S.A., (9 pages).

Thomas D. Smith, Ph. D. P. E., Gunfire Source localization Systems presented to IUI/LIRIS/MADL Proposal Kick–Off Meeting, Nov. 16, 1994, U.S.A. (11 pages).

Thomas D. Smith, Ph. D. P. E., Innovations Unlimited Inc., Sniper Location System–Acoustic Warning Subsystem, Relevant Programs, Jul. 27, 1995, U.S.A., (12 pages).

Eugene Rubin, Affidavit of Eugene Rubin, Sep. 10, 1998, U.S.A., (6 pages).

Burt Figler, Affidavit of Burt Figler, Aug. 19, 1998, U.S.A. (4 pages).

Leonard Paris, Affidavit of Leonard Paris, Aug. 19, 1998, (4 pages).

Loral Infrared & Imaginng Systems, Integrated Sniper Location System, Nov. 30, 1994, U.S.A. (58 pages).

Loral Infrared & Imaginng Systems, Integrated Sniper Location System (I–SLS), Quickly Fieldable Technology Demonstrator (QFTD), Aug. 03, 1995, U.S.A. (93 pages).

Loral Infrared & Imaginng Systems, Quickly Fieldable Technology Demonstrator, Nov. 30, 1994, U.S.A. (53 pages).

IUI/LIRIS/MADL, SLS Proposal Kick–Off Meeting, Nov. 16, 1994, U.S.A. (13 pages).

Loral Infrared & Imaginng Systems and Innovations Unlimited, Inc., Sniper Location System a white paper to Army Research Laboratory, Jul. 20, 1994, U.S.A. (16 pages).

Loral Infrared & Imaginng Systems, Integrated Sniper Location System (I–SLS), Quickly Fieldable Technology Demonstrator (QFTD), Aug. 03, 1995, U.S.A., (30 pages).

Innovations Unlimited Inc., Sniper Location System–Acoustic Warning Subsystem, Jul. 27, 1995, U.S.A. (12 pages).

Lee A. Hess, Department Of The Army, Contract Section, Jun. 15, 1995, U.S.A. (1 page).

H. Lee Buchanan Advanced Research Projects Agency, Letter to LIRIS, Jul. 28, 1995, U.S.A. (1 page).

Invitation To Brief Your Proposal Against Solicitation No. DAALO1–95–R–ARL–BAA On 23–24 HJAN 95 at La Jolla, CA, U.S. Army Labcom/S3T0, Jan. 13, 1995, U.S.A. (8 pages).

Loral Infrared & Imaginng Systems and Innovations Unlimited, Inc., Draft Sniper Location, White Paper, 1994, (9 pages).

H. Lee Buchanan Advanced Research Projects Agency, Letter to LIRIS, Dec. 22, 1995, U.S.A. (1 page).

ACOUSTO-OPTIC WEAPON LOCATION SYSTEM AND METHOD

1. FIELD OF THE INVENTION

The present invention relates to a system and method which combines acoustical and optical detection and location technologies in order to localize and/or calculate and/or determine the source of hostile weapons fire such as that emanating from a sniper.

2. BACKGROUND OF THE INVENTION

Previous weapon location systems (as used throughout this Application, the term "system" refers to a combination, in one embodiment, of hardware, software, and/or firmware which cooperates to perform one or more applications or functions) use either a purely or substantially singular acoustical detection apparatus or techniques or a purely or substantially singular optical detection apparatuses and/or techniques to locate the source of hostile weapon fire. Due to the problems and/or drawbacks associated with purely acoustical and purely optical detection techniques or substantially pure or singular techniques, the present invention combines the two concepts or technologies in order to utilize the advantages and substantially eliminate the disadvantages of each technology. Applicant has found that the combination of acoustical and optical detection mechanisms greatly enhances the overall detection capability of the system. Applicant believes that there was, prior to Applicant's invention, no and/or substantially little or substantially no motivation to combine these techniques in the manner done by Applicant.

Acoustical detection systems generally determine the direction and/or location of hostile weapon fire by measuring and/or calculating the arrival of "sound" or acoustic energy generated by the hostile fire by the use of generally and equally spaced microphones formed or placed in a microphone array. Most prior acoustical hostile weapons fire detection and/or location systems are characterized by generally omnidirectional detection, only moderate accuracy and a substantially minimal false alarm rate. While such prior acoustic systems provide useful information for many applications, purely and/or substantially pure acoustical detection systems are not entirely appropriate for certain applications, such as applications involving the detection of the firing of supersonic and/or substantially supersonic projectiles. That is, supersonic projectiles arrive to the target prior to the arrival of the acoustic energy generated by the firing of these supersonic projectiles. Thus, an immediate counter-measure launch, necessary to destroy the incoming supersonic missiles, is generally not possible when a purely or singular acoustical system is used to detect the presence and/or location of such supersonic enemy fire. Additionally, it is well known that acoustic detection systems generally have a fairly large error in the determination of the location of the hostile weapon. In the past, this was not really a problem since offensive countermeasures which were used to destroy the hostile weapon usually comprised one or more missiles which destroyed a relatively large area. This wide area of destruction mostly and adequately compensated for the errant location data provided by the acoustic detection and/or location systems. However, war has changed. Oftentimes snipers, located within relatively densely populated areas are now encountered. Hence, large destructive countermeasures, necessary to compensate for errant location calculations, are generally not appropriate since they might hurt or kill many innocent people and destroy many valuable and historic buildings and/or other structures.

Optical detection systems generally determine the location and/or direction of hostile weapons fire by observing and/or sensing the position of the optical energy released or generated when a weapon is discharged. Most optical systems are characterized by relatively high accuracy, relatively high amounts or levels of false alarms and a rather limited field of view. Purely optical systems are also of rather limited value in some ambient light conditions where distinguishing the flash of a weapon from false flashes or other types of visible radiation is difficult. Purely optical systems are also of rather limited value where a weapon is obstructed or outside of the optical system's field of view. Hence, these prior optical detection systems were used only in very few specific applications, mainly due to their relatively high false alarm rate. Heretobefore, only one type of these systems was used to determine/calculate the location of adverse weaponry. No one, prior to Applicant's discovery and/or invention, had realized the benefit of combining these two types of dissimilar systems in a manner which would overcome the drawbacks of each of these systems and provide a more robust system.

That is, Applicant was the first to realize that great accuracy and usefulness could be achieved by first using an acoustic system to determine the general location of the hostile weapons fire, a function that such prior acoustic systems performed relatively well, and then using an optical system or referring to or reviewing captured optical data in order to further refine the location within the field established by the acoustic system. In this manner, the relatively notorious "false alarms" associated with the optical systems could be minimized since the optical data only from the field of view formed or "fixed" by the acoustical technique would be reviewed. Moreover, the concomitant use of optical system data could allow even supersonic projectiles to be detected. This new combined system thus allows great accuracy which is necessary when detecting hostile weapons fire in cities and other areas in which greatly destructive missile counteroffensive apparatuses cannot be used.

There is therefore a need for, and it is a principal object of this invention to provide, a weapon and/or hostile weapons firing location and localization system which overcomes the aforementioned drawbacks of the prior substantially purely acoustical and substantially purely optical detection systems and which, in fact, combines the advantages and the techniques of the two systems to achieve a system characterized by general omnidirectional detection, a relatively low false alarm rate, relatively high accuracy and relatively immediate counter-measure capability. In essence, Applicant has discovered that one may utilize the accuracy of infrared systems in combination with "gross" type location data specified by the acoustic systems to provide a very desirable system. As used in this Application, the terms "location" and "localization" each mean the location of an entity (e.g. hostile weapons fire) as well as the processes to locate the firing entity. Thus, these words may be used interchangeably.

SUMMARY OF THE INVENTION

According to a first aspect of the present invention, a weapon location and/or detection system is provided which combines an acoustical detection system and an optical detection system to utilize the advantages and substantially reduce and/or eliminate the disadvantages of each technology.

According to a second aspect of the present invention, a weapon location and/or detection system is provided which is designed to determine the location of hostile weapon fire and which generally has omnidirectional detection capability, a relatively low false alarm rate, relatively high accuracy and relatively immediate counter-measure capability.

In one embodiment of the present invention, a weapon location and/or detection system adapted to determine the location of hostile weapon fire is provided. The system comprises acoustical detection means for detecting energy of a first frequency originating from the firing of the hostile weapon, and for creating and transmitting a first set of data describing the location of the hostile weapon; optical detection means for detecting energy of a second frequency originating from the firing of the hostile weapon, and for creating and transmitting a second set of data describing the location of the hostile weapon; and processing means communicatively coupled to the acoustical and the optical detection means, for receiving the first and the second set of data and for comparing the first and second sets of data and for generating a signal output if the comparison yields and/or results in a match.

In another embodiment of the present invention a weapon location system adapted to determine the location of hostile weapon fire is provided. In this alternate embodiment the system comprises acoustical detection means for detecting energy of a first frequency originating from hostile weapon fire and for transmitting a first set of data describing the location of said hostile weapon fire; laser detection means communicatively coupled to the acoustical detection means for receiving the first set of data, for scanning the location described by the first set of data, for detecting particles associated with discharge of said hostile weapon fire, and for transmitting a second set of data describing the location of said particles; and processing means communicatively coupled to the acoustical and the optical detection means, for receiving said first and said second set of data, and for determining whether the location of the first set of data match or correspond to the location of the second set of data and for generating a signal output if a match and/or correspondence occurs.

According to yet another embodiment of the invention a methodology for determining the location of hostile weapons fire is provided. In a first aspect of this methodology embodiment, the method comprises the steps of sensing acoustical energy associated and/or generated from the hostile weapons fire; sensing optical energy associated and/or generated from the hostile weapons fire; calculating a first location using only the sensed acoustical energy; calculating a second location using only the sensed optical energy; comparing the first and second locations; and providing an output signal if the first location is substantially similar to the second location.

Further objects, features, and advantages of the present invention will become apparent from any consideration of the following description and the appended claims, when taken in conjunction with the accompanying drawings.

BRIEF DESCRIPTION OF THE DRAWINGS

For a fuller and more complete understanding of the nature and objects of the present invention, reference should be had to the following drawings in which.

DETAILED DESCRIPTION OF THE INVENTION

Figure 1:
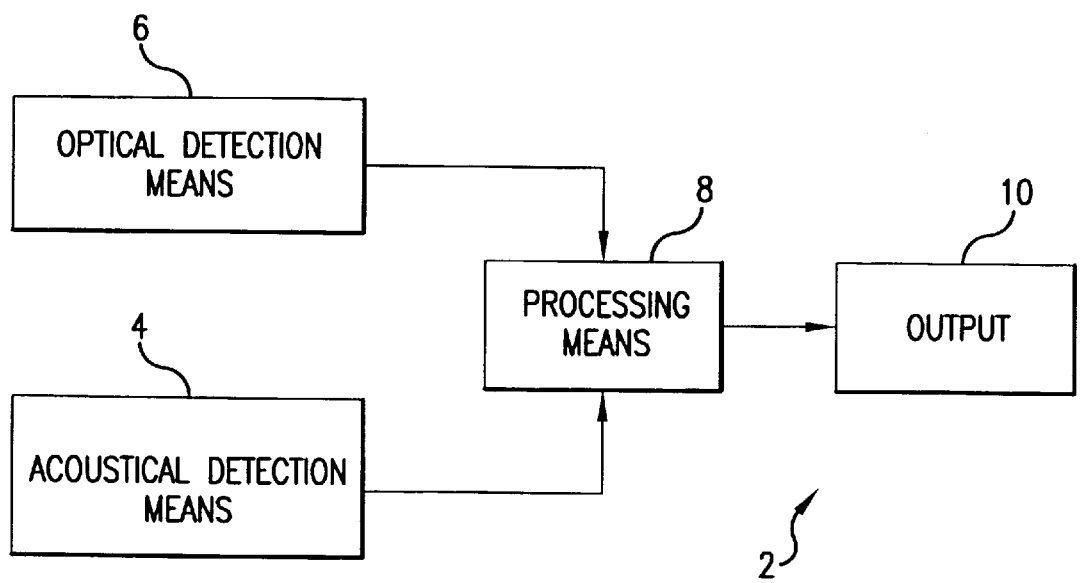
FIG. 1 is a block diagram of the preferred embodiment of the present invention.

Referring now to FIG. 1, there is shown a block diagram of a weapon and/or hostile fire location and/or detection system 2 which is made in accordance with the preferred embodiment of this invention. As shown, weapon location/detection system 2 includes an acoustical detection means 4, an optical detection means 6, a processing means 8, and an output providing means 10.

According to one aspect of the system 2, acoustical detection means 4 comprises, for example and without limitation, those acoustical systems, devices, and/or apparatuses which are more fully described in U.S. Pat. No. 5,258,962 entitled "Acoustic Projectile Trajectory Evaluation Device", invented by Lasse Karlsen; U.S. Pat. No. 4,350,881, entitled "Projectile Position Detection Apparatus", and invented by Knight et al.; and U.S. Pat. No. 4,885,725, entitled "Position Measuring Apparatus and Method", and invented by McCarthy et al,. Each of these United States patents is hereby fully and completely incorporated by reference as if fully and completely set forth herein, word for word and paragraph by paragraph.

Figure 3:
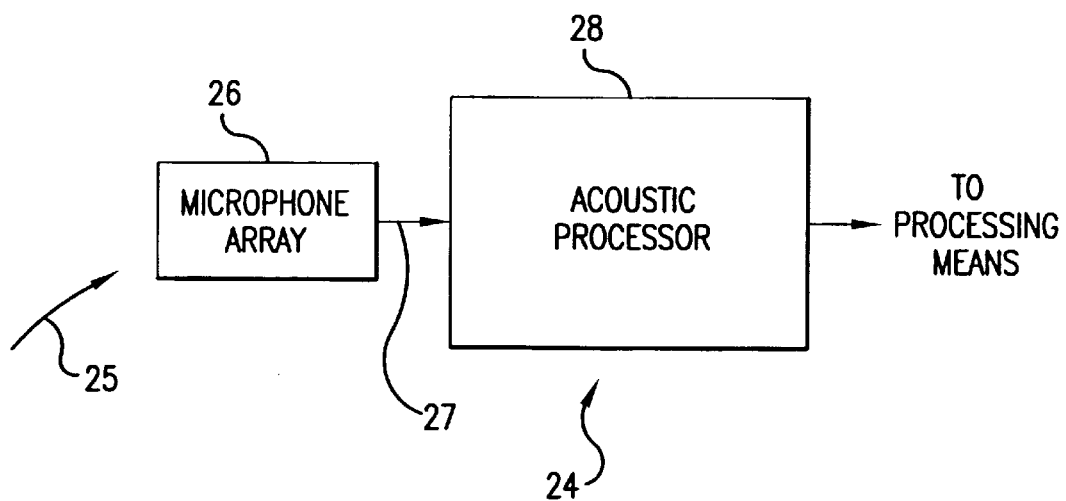
FIG. 3 is a block diagram of an acoustical detection means used in the preferred embodiment of the present invention.
Figure 4:
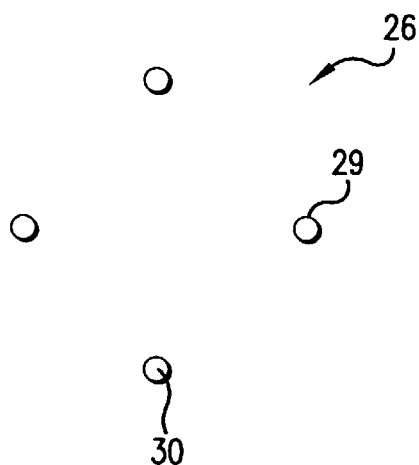
FIG. 4 is a top view of a microphone array which may be used in the present invention.

FIG. 3 illustrates one exemplary type of acoustical detection system 24 which may be used in and by the invention. As shown, acoustical detection system 24 comprises and/or includes a microphone array 26 (pictured alone in FIG. 4) and an acoustic processor 28. Each of the microphones arranged within microphone array 26 operates and is adapted to receive incoming acoustical energy 25 of a first acoustical or "sound" frequency (most probably in the range of about 300 hz to about 3000 hz) originating and/or associated with the firing of a hostile weapon, and to transmit a separate signal 27 from each microphone 29 in microphone array 26 to an acoustic processor 28. Acoustic processor 28, in the preferred embodiment of the invention comprises, a microprocessor operating under stored program control and associated operating hardware and software. Such microprocessor assembly arrangements are described more fully in the textbook entitled "Computer Architecture and Organization" which was authored by John P. Hayes, published by the McGraw-Hill book company and having a library reference identification of 15BN 0-67-027363-4 and which is fully and completely incorporated herein by reference, word for word, and paragraph for paragraph. Specifically processor assembly 28 determines and/or calculates the location of the source of the acoustic energy (e.g. the location of the weapon whose firing generated the energy) and creates and transmits location data describing the hostile weaponry location to processing means 8 by use, in one embodiment, of algorithms and other known mathematical operations described more fully in the previously incorporated United States patents and which are known to those skilled in this art.

Acoustical detection system 24, and more particularly processor or processor means 28, in the preferred embodiment of the invention, determines values such as time of energy arrival, azimuth, elevation/depression angle, arrival angle and trajectory of the incoming acoustic energy. The acoustical detection system 24 may also employ a filter (not shown) to distinguish and/or "block out" some of the various acoustic energies received by microphone array 26 in order not to have processor 28 errantly process non-weapons firing noises. That is, for example and in one embodiment, the filter will allow only those frequencies associated with a specific type of hostile weapons fire to reach the array 26. Similarly, acoustic energy characteristics will vary with each type of employed hostile weapon. Hence, filter design characteristics in acoustical detection system 24 will be varied to optimize detection. Particularly, the filters will be designed/selected in order to allow only the energies of the known hostile weapons systems to be coupled to processor 28. The precise operation and calculations of acoustical detection system 24 is more fully described and illustrated by the inventor in the aforementioned fully incorporated patent references. It is important to note that the invention is not limited to use with the exact acoustic detection systems described in these previously incorporated references. Applicant realizes that a number of other acoustical detection systems can and should be used that would produce substantially similar or even superior results and would not depart from the spirit and scope of the invention and the inclusion and/or use of these previously described/incorporated acoustic system embodiments in Applicant's invention should not be construed so as to limit the nature of the described invention or in any manner affect the scope of the subjoined claims.

Optical detection means 6 used in the preferred embodiment of this invention may comprise a conventional and commercially available optical detection system, examples of which are more fully described in U.S. Pat. No. 3,944,167 entitled "Radiation Detection Apparatus" and invented by Figler et al.; and U.S. Pat. No. 3,848,129 entitled "Spectral Discriminating Radiation Detection Apparatus" and invented by Figler et al,. Each of these United States patent references are fully and completely incorporated herein by reference as if fully and completely set forth herein, word for word and paragraph by paragraph. One example of a suitable optical detection system is the commercially available model IRC-160ST Staring-Mid Wavelength Infrared Camera, manufactured and sold by Cincinnatti Electronics (Cincinnatti, Ohio).

Figure 5:
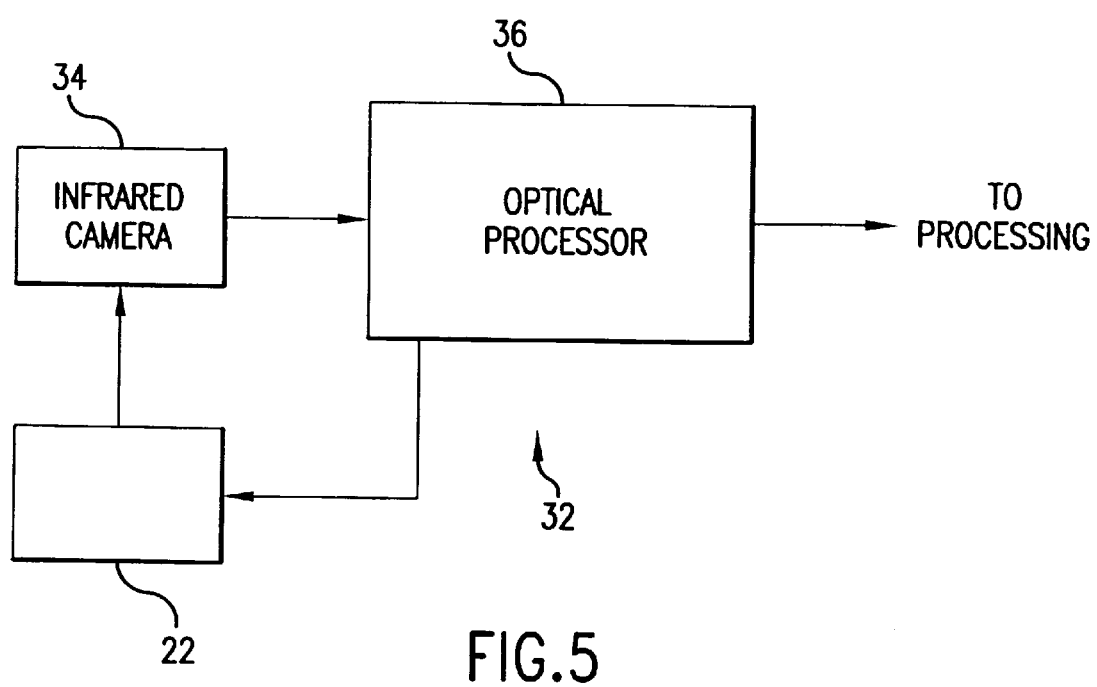
FIG. 5 is a block diagram of an optical detection means used in the preferred embodiment of the invention.

As shown in FIG. 5, the optical detection system 32 used in the preferred embodiment of the present invention (corresponding in one embodiment to optical detection means 6) comprises an infrared camera 34 and an optical processor assembly 36 which, in one embodiment of the invention, comprises a microprocessor assembly operating under stored program control. Such an assembly may be substantially similar to the previously described assembly 28 and described in the previously incorporated Hayes textbook reference.

Infrared camera 34 operates and/or functions to receive incoming energy of a second or "infrared" or visual type of frequency originating from and/or associated with hostile weapon fire and upon receiving and/or sensing this incoming energy transmits a signal to an optical processor 36. Optical processor 36 determines the location of the source of the hostile weapon fire and creates and/or transmits data describing the calculated/determined location to processing means 8. Such calculations and/or determination are made by use of, in one embodiment, algorithms and mathematical analyses which are more fully described in the United States patent references which are fully incorporated herein by reference and which are known to those skilled in this art.

Particularly, as more fully described in these prior incorporated references, optical detection system 32 will determine values such as azimuth, time of occurrence and elevation/depression angle of the incoming energy. The precise operation and calculations of optical detection system 32, are more fully described in the aforementioned fully incorporated references. The invention is not limited to use with the aforementioned optical detection system. Certain design details will vary depending upon the class of hostile weapons to be detected and localized. For example, and without limitation, certain weapons such as antitank missiles may have a stronger signature in one of the infrared, visible or ultraviolet bands. The camera employed in weapon localization system 2 will correspond to the frequency of the desired weapon. Furthermore, Applicant realizes, as should one of ordinary skill in the art, that a number of other optical detection systems can be used that would produce substantially similar results and not depart from the spirit of the invention.

Figure 2:
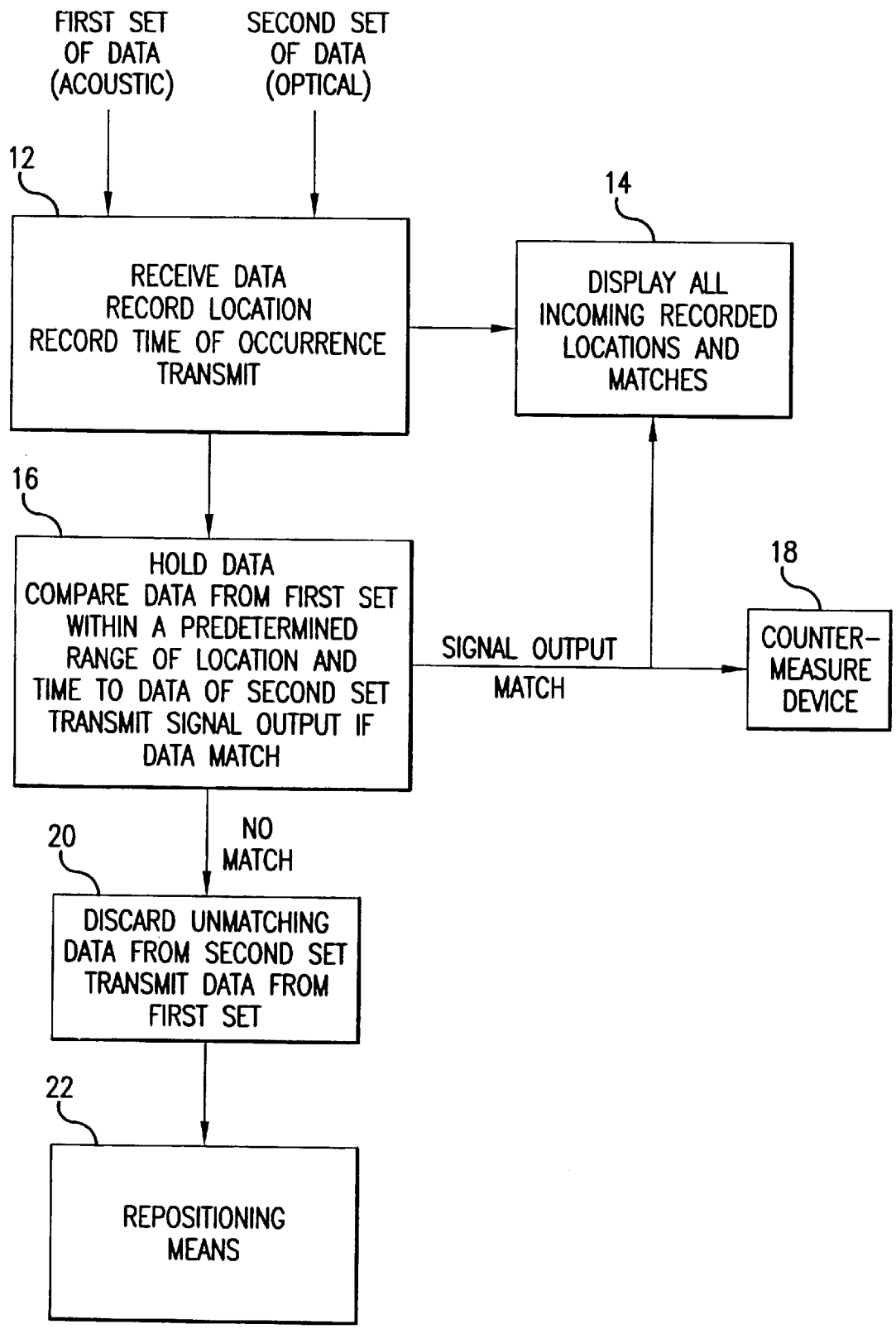
FIG. 2 is a block diagram of the operation of the processing means used in the preferred embodiment of the present invention.

To understand the operation of weapon localization system 2, reference is now made to FIG. 2 which illustrates the operation of the processing means 8 used in the preferred embodiment of the invention. It should be obvious to those skilled in the art that other types of operations are possible. In the preferred embodiment of the invention, processing means 8 is a microprocessor assembly acting under stored program control and which may substantially correspond to the previously described microprocessor assemblies 24 and 28. One example of an acceptable processor for use in these assemblies is a commercially available Pentium® type processor. According to one aspect of the present invention, processing means 8 is communicatively and physically coupled to processing means 28 and 36 and receives first and second sets of data from acoustic detection system 24 and optical detection system 32, respectively. Processing means 8 records the location and time of occurrence of each set of data received and output the data to a display, as indicated by software operation blocks 12, 14. Processing means 8 holds and/or stores all locations from the second set of data for a predetermined period of time and compares these stored locations with locations from the first set of data, as indicated by block 16. A "match" or "hit" is indicated when a location and time from the first set of data (hereinafter referred to as the "acoustic event") fall within a predetermined range of a location and time from the second set of data (hereinafter referred to as the "optic event"). If a match is detected, processing means 8 will generate a signal output, as indicated by block 16. Indicating that both the acoustic and infrared systems "match" and correspond to a hostile weapons location. In the preferred embodiment of the invention, the signal output will be transmitted to a display, indicated by block 14, where it will be shown in a manner different from the displayed locations of unmatched data points. The signal output will also indicate whether the acoustic event occurred before the optically sensed event. When the acoustic event occurs before the optically sensed event, the optical event actually represents a subsequent attack from the same location, since optical energy generally reaches the observer before acoustic energy and the associated missile. In such a case, a counter-measure against the incoming missile may be launched. In the preferred embodiment of the invention, a counter-measure device, indicated by block 18, receives the signal output and is designed to position a weapon and fire a counter-attack at the predicted location of the missile and/or the missile's origin. Data such as azimuth, elevation/depression angle, arrival angle and trajectory of the incoming energy can be used to calculate the path of the missile and intercept it before arrival.

Figure 6:
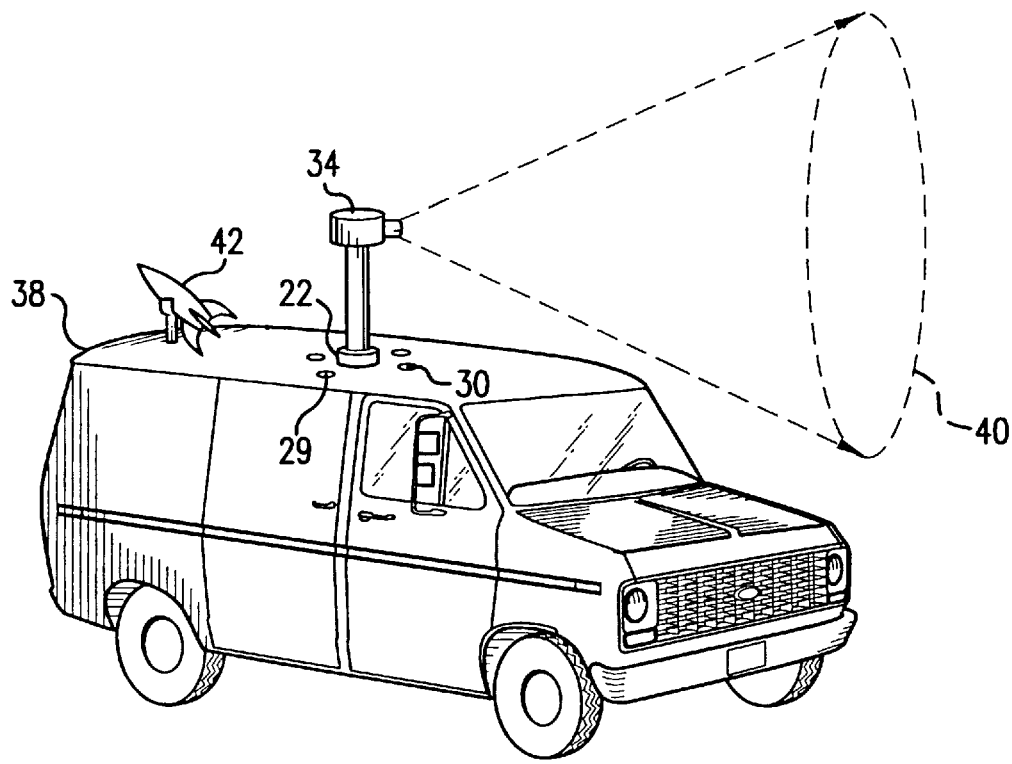
FIG. 6 is a perspective view of components of the preferred embodiment of the present invention employed on the exterior of a vehicle.

If no matches are detected within a predetermined period of time, the unmatching locational data from the optical event will be discarded, as indicated by block 20, and the unmatching data from the acoustic event will be transmitted to a repositioning means, as indicated by block 20, 22. As best shown in FIGS. 5 and 6, repositioning means 22 will rotate infrared camera 34 so the field of view 40 of infrared camera 34 is centered in the location of the acoustic event, thus ensuring a match in the event of subsequent fire from that location. In this manner, the infrared camera 34 is "keyed" to a specific area thereby reducing the false alarms and taking advantage of the relatively great accuracy of the optical detection means. In essence, the broad acoustic detection techniques and system is used to fix a rather coarse location and the optical detection system is used to further refine this detection.

To determine the range or distance to the hostile weapons fire, the invention uses a "flash-bang" analysis. In one embodiment, processing means 8 takes the second or optical data and notes the time of its arrival. Then, processing means 8 takes the first or acoustical data which arrives later than the optical data and note the time of this arrival. Then processing means 8 takes the difference between the two times (which is directly proportional to the range) and by a known mathematical algorithm determines the range. In one example, the difference is multiplied by the speed of sound and this value is used as the range.

Figure 7:
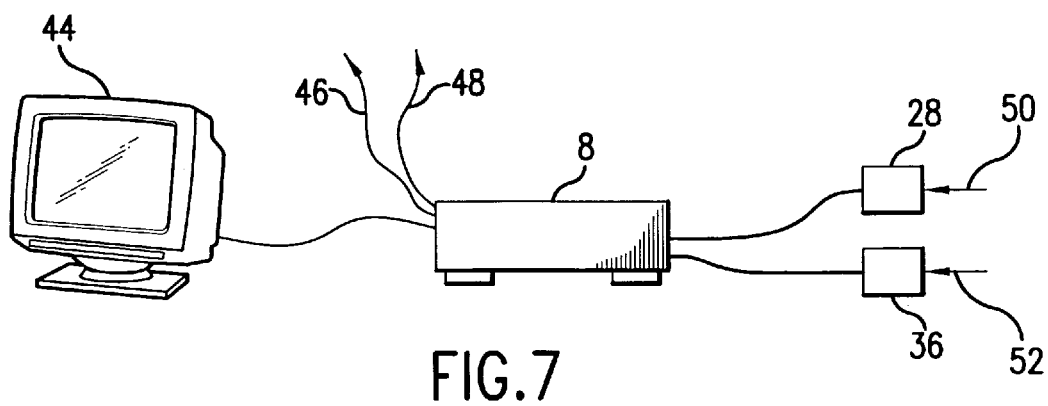
FIG. 7 is a side view of components of the preferred embodiment of the present invention employed within a vehicle.

Referring now to FIGS. 6 and 7 there is shown one exemplary type of embodiment of a hostile weapon location/detection system 2 made in accordance with the teachings of the invention and illustrated and described as used or employed in combination with countermeasure devices and/or apparatuses. Specifically, FIG. 6 illustrates the exterior of a military vehicle 38 with installed components of weapon localization system 2, including microphone array 30, infrared camera 34, repositioning means 22 and a counter-measure device 42. FIG. 7 illustrates the components residing in the interior of military vehicle 38, including processing means 8, acoustic processor 28, optic processor 36, display 44, output line 46 (leading to repositioning means 22), output line 48 (leading to counter-measure device 42), input line 50 (from microphone array 30), and input line 52 (from infrared camera 34).

Figure 8:
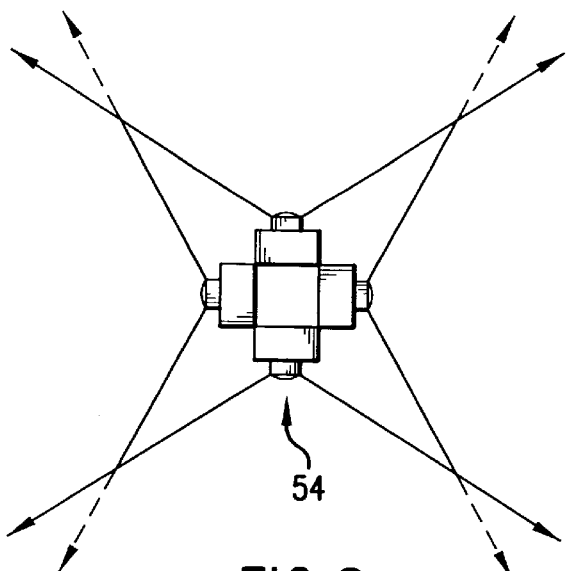
FIG. 8 is a top view of a camera array which may be used in the present invention.

Weapon location/detection system 2 may also function and/or operate with a camera array 54 (pictured alone in FIG. 8) replacing singular and/or substantially singular infrared camera 34. Camera array 54 is designed to have a cumulative field of view of about 360 degrees. In such case, repositioning means 22 is not included in weapon localization system 2, nor is it required, since camera array 54 covers all possible fields of view. Other than the absence of repositioning means 22, weapon localization system 2 with camera array 54 operates in substantially the same manner as previously described.

Figure 9:
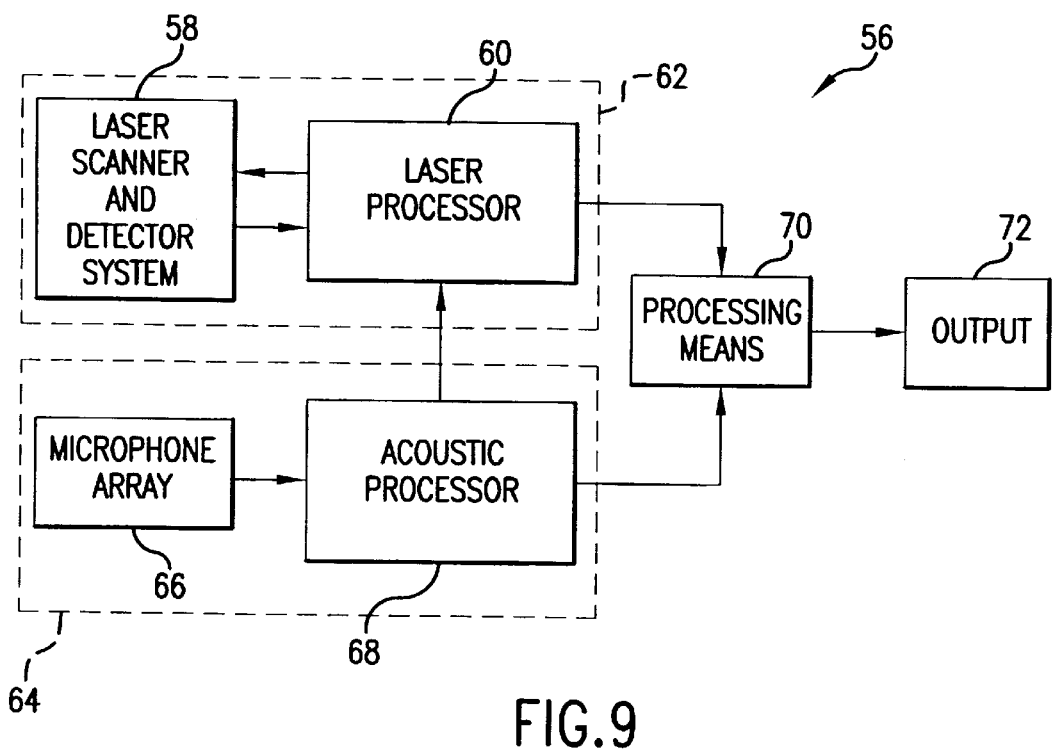
FIG. 9 is a block diagram of the operation of a second embodiment of the present invention.

Referring now to FIG. 9, there is shown a weapon location/detection system 56 which represents a second embodiment of the present invention. As shown, weapon localization system 56 includes an acoustical detection system 64, comprising an acoustic processor 68 (which may correspond or be substantially identical to the type of microprocessor assembly as assembly 28), a microphone array 66; a laser detection system 62, comprising a laser processor and a laser scanner and detector system; a processing means 70 (which may correspond to the type of microprocessor assembly as assembly 28); and an output display means 72.

Acoustical detection system 64 may be a conventional and commercially available acoustical detection system substantially similar to previously described acoustical detection system 24. Acoustical detection system 64 operates in substantially the same manner as acoustical detection system 24 with the exception that instead of a single output transmission, acoustic processor 56 determines the location of the source of the acoustic energy and transmits a first set of data describing such location to processing means 70 and laser processor 60, as shown in FIG. 9. Weapon localization system 56 is not limited to use with acoustic detection system 64. The inventor realizes, as should one of ordinary skill in the art, that a number of other acoustical detection systems can be used that would produce substantially similar results and would not depart from the spirit and scope of the invention as, for example, delineated within the subjoined claims.

Laser detection system 62 may be a conventional and commercially available laser detection system, examples of which are more fully described in the article entitled "Laser Remote Sensing, Air Pollution," authored by Hun and published by the U.S. Department of Energy (hereby incorporated by reference as if fully and completely set forth herein, word for word and paragraph by paragraph) and sold by OCA Applied Optics (Garden Grove, Calif.) and Laser Technology, Inc. (Englewood, Colo.).

Figure 10:
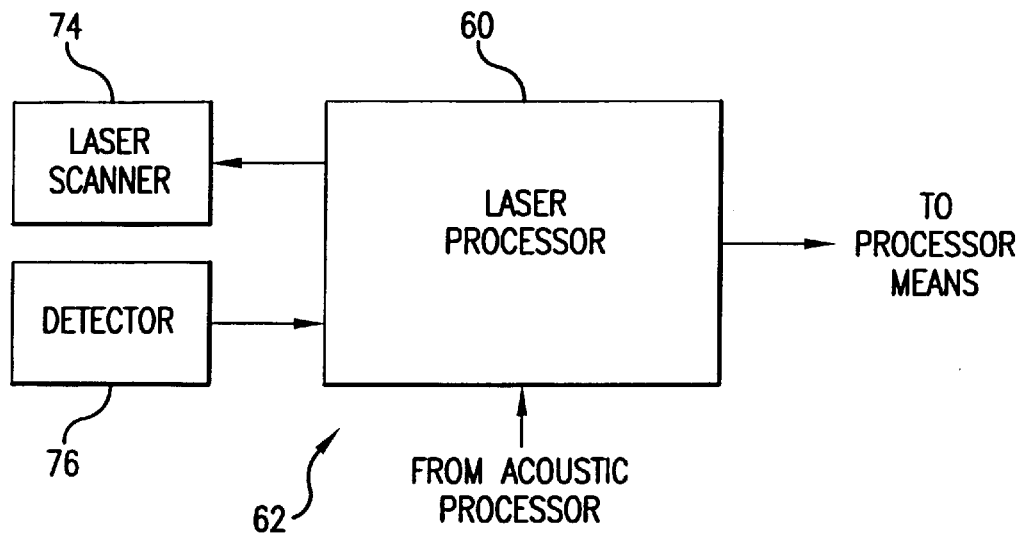
FIG. 10 is a block diagram of a laser detection system used in the second embodiment of the present invention.

Specifically, laser detection system 62 comprises laser scanner and detector system 58 and laser processor 60. Laser processor 60 receives the first set of data from acoustic processor 68, determines the approximate direction to the missile trajectory and source and transmits this information to laser scanner and detector system 58. Referring now to FIG. 10, there is shown a block diagram representing laser detection system 62. Laser scanner 74 emits a laser beam which scans the area received from laser processor 60. Detector 76 detects the reflections occurring when the laser beam contacts particles, such as aerosols, which are emitted through discharge of a weapon and which are left in the trail of a missile's trajectory near the muzzle of the weapon. Detector 76 transmits a signal to laser processor 60 which determines the location of the source of the hostile weapon fire by either calculating the range and azimuth from particles at the point of discharge or extrapolating the detected trajectory to an estimated origin. Laser processor 60 then transmits a second set of data describing such location to processing means 70. Laser detection system 70 will determine values such as azimuth, range, and the trajectory path of the incoming missile. The precise operation and calculations of laser detection system 70, is more fully described in the aforementioned references. Weapon localization system 56 is not limited to use with the aforementioned laser detection system. Furthermore, inventor realizes, as should one of ordinary skill in the art, that a number of other laser detection systems can be used that would produce substantially similar results and not depart from the spirit of the invention.

Figure 11:
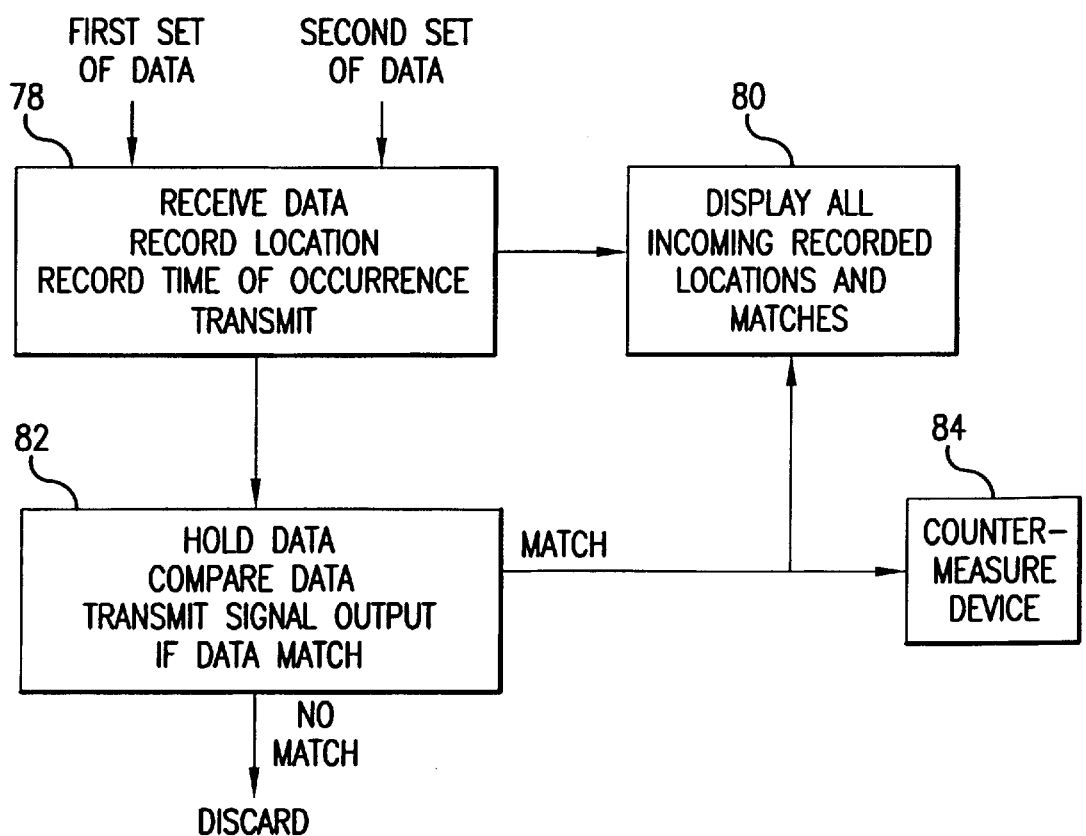
FIG. 11 is a block diagram of the operation of the processing means used in the a second embodiment of the present invention.

To understand the operation of weapon localization system 56, reference is now made to FIG. 11 which illustrates the operation of the processing means 70 used in the preferred embodiment of the invention. In the preferred embodiment of the invention, processing means 70 is a digital or analog or combined digital and analog signal processor or a microprocessor acting under stored program control. Processing means 70 will receive first and second sets of data from acoustic detection system 64 and laser detection system 62. Processing means 70 will then record the locations and time of occurrence of each set of data received and output the data to a display, as indicated by blocks 78, 80. Processing means 70 will then hold all locations from the first set of data for a predetermined period of time and compare with locations from the second set of data, as indicated by block 82. A match will be indicated when location and time from the first set of data (hereinafter referred to as the "acoustic event") and the second set of data (hereinafter referred to as the "laser event") fall within a predetermined ranges of each other. If a match is not detected within a predetermined period of time, the unmatching data will be discarded. If a match is detected, processing means 70 will generate a signal output, as indicated by block 82. In the preferred embodiment of the invention, the signal output will be transmitted to a display, indicated by block 80, where it will be shown in a manner different from the displayed locations of unmatched data points. In the preferred embodiment of the invention, a counter-measure device, indicated by block 84, receives the signal output and is designed to position a weapon and fire a counter-attack at the predicted location of the missile's origin.

It is to be understood that the invention is not limited to the exact construction or method illustrated and described above, but that various changes and modifications may be made without departing from the spirit and scope of the invention as defined in the following claims. Moreover, it should be realized that Applicant's weapon location system invention is superior to those of the prior art in that Applicant has combined two dissimilar types of weapons location systems in order to produce a system providing highly superior results which has hereto before not been obtainable.

I claim:

1. A weapon localization system adapted to determine the location of hostile weapon fire, said system comprising:
   acoustical detection means for detecting energy of a first frequency originating from said hostile weapon fire, and for transmitting a first set of data describing the location of said hostile weapon fire;
   optical detection means for detecting energy of a second frequency originating from said hostile weapon fire, and for transmitting a second set of data describing the location of said hostile weapon fire; and
   processing means coupled to said acoustical and said optical detection means, for receiving said first and said second set of data, and for determining whether said location of said first set of data match said location of second set of data and for generating a signal output if said match occurs.

2. The weapon localization system according to claim 1 further comprising, repositioning means for moving said optical detection means if said location of first and said second set of data fail to match.

3. The weapon localization system according to claim 1 wherein the acoustical detection means comprises an array of microphones for detecting sound waves originating from said hostile weapon fire.

4. The weapon localization system according to claim 1 wherein the said optical detection means comprises an infrared camera for detecting energy originating from said hostile weapons fire.

5. The weapon localization system according to claim 1 wherein the said optical detection means comprises an array of infrared cameras, for detecting energy originating from said hostile weapon fire in all directions simultaneously.

6. The weapon localization system according to claim 1 wherein said processing means comprises an analog processor, digital processor, or a microprocessor acting under stored program control.

7. The weapon localization system according to claim 1 further comprising, a countermeasure means for elimination of said hostile weapon fire based upon the location specified by said first and said second set of data.

8. The weapon localization system according to claim 1 further comprising a display.

9. A method of determining the location of hostile weapon fire, which comprises the steps of:
   detecting energy of a first frequency originating from said hostile weapon fire;
   transmitting a first set of data describing the location of said hostile weapon fire;
   detecting energy of a second frequency originating from said hostile weapon fire;
   transmitting a second set of data describing the location of said hostile weapon fire;
   receiving said first set and said second set of data and determining whether said location of said first set of data match location of said second set of data; and
   generating a signal output if said match occurs.

10. A weapon localization system adapted to determine the location of hostile weapon fire, said system comprising:
    acoustical detection means for detecting a sound wave originating from said hostile weapon fire, and for transmitting a first set of data describing the location of said hostile weapon fire;
    laser detection means coupled to said acoustical detection means, for receiving said first set of data, scanning the location described by said first set of data, detecting particles associated with discharge of said hostile weapon fire, and transmitting a second set of data describing the location of said particles;
    processing means coupled to said acoustical and said laser detection means, for receiving said first and said second set of data, and for determining whether said location of said first set of data match said location of second set of data and for generating a signal output if said match occurs.

11. The weapon localization system according to claim 10 wherein the laser detection means comprises:
    a laser scanner for scanning a predetermined range of space described by said first set of data with a laser beam;
    a detector, for detecting reflections caused by said laser beam contacting particles associated with discharge of said hostile weapon fire, and for transmitting a second set of data describing the location of said particles.

12. The weapon localization system according to claim 10 wherein the acoustical detection means comprises an array of microphones for detecting sound waves originating from said hostile weapon fire.

13. The weapon localization system according to claim 10 wherein said processing means comprises an analog or digital or combined analog and digital signal processor or a microprocessor acting under stored program control.

14. The weapon localization system according to claim 10 further comprising, a countermeasure means for elimination of said hostile weapon fire based upon the location specified by said first and said second set of data.

15. A method for determining the location of hostile weapons fire, said method comprising the steps of:
   (a) sensing acoustical energy generated from said hostile weapons fire;
   (b) sensing optical energy generated from said hostile weapons fire;
   (c) calculating a first location using only the sensed acoustical energy;
   (d) calculating a second location using only the sensed optical energy;
   (e) comparing said first and said second locations; and
   (f) providing an output signal only if said first and said second locations match.

16. The method of claim 15 wherein said optical energy comprises infrared energy.

17. The method of claim 15 wherein said hostile weapons comprises a supersonic missile.

18. A method for determining the distance to a fire of hostile weapon where the initial direction of the weapon is unknown, said method comprising the steps of:
   (a) Sensing acoustical energy generated from said hostile weapons fire;
   (b) Sensing optical energy generated from said hostile weapons fire;
   (c) Determining a first time at which said acoustical energy was sensed;
   (d) Determining a second time at which said optical energy was sensed;
   (e) Determining a difference between said first and said second times; and
   (f) Calculating said range by use of difference in said first and said second times.

* * * * *